M. R. LOWELL.
INCUBATOR ATTACHMENT.
APPLICATION FILED FEB. 15, 1913.
1,082,350.
Patented Dec. 23, 1913.
2 SHEETS—SHEET 1.
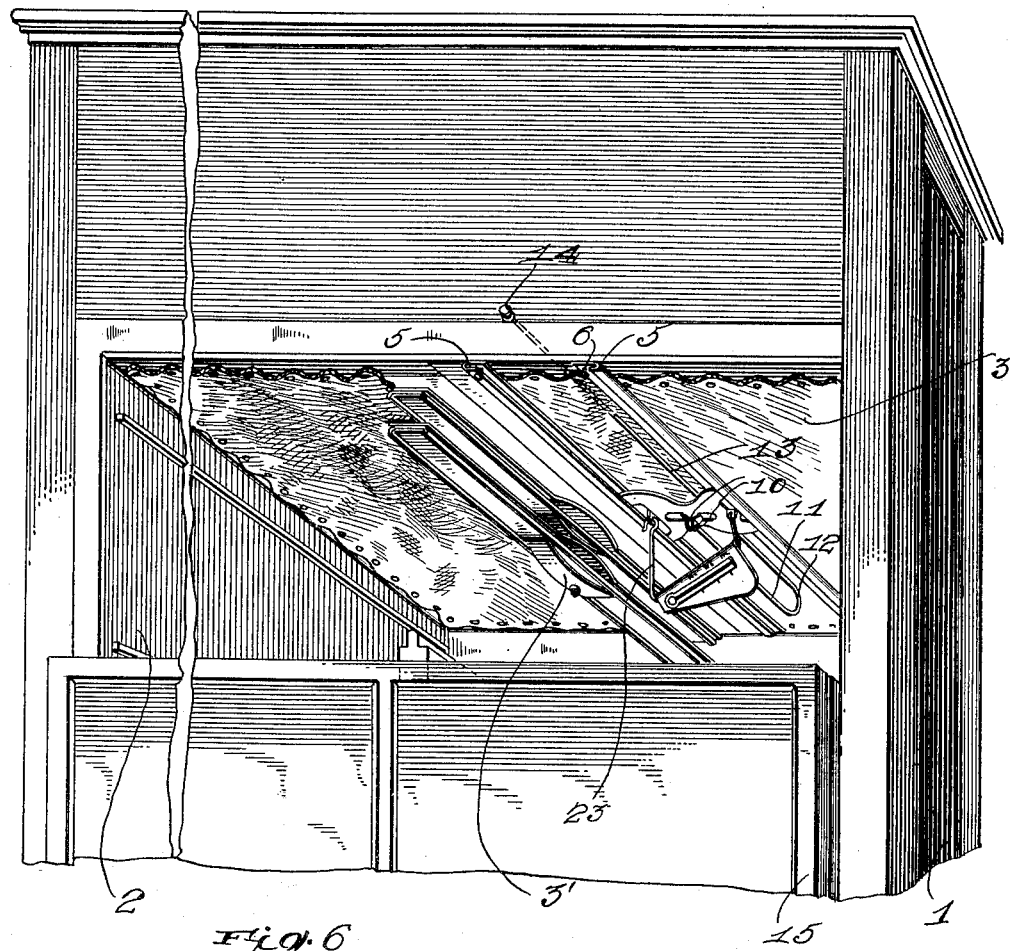
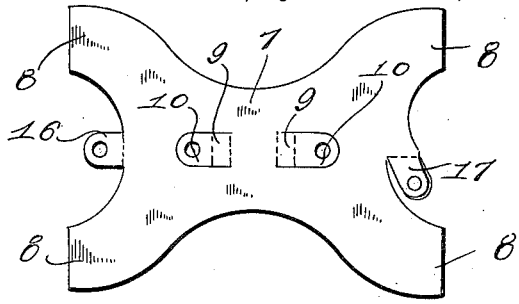
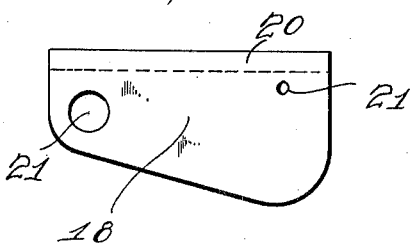
WITNESSES
INVENTOR
Murland R. Lowell
his Attorney.

M. R. LOWELL.
INCUBATOR ATTACHMENT.
APPLICATION FILED FEB. 15, 1913.
1,082,350.
Patented Dec. 23, 1913.
2 SHEETS—SHEET 2.
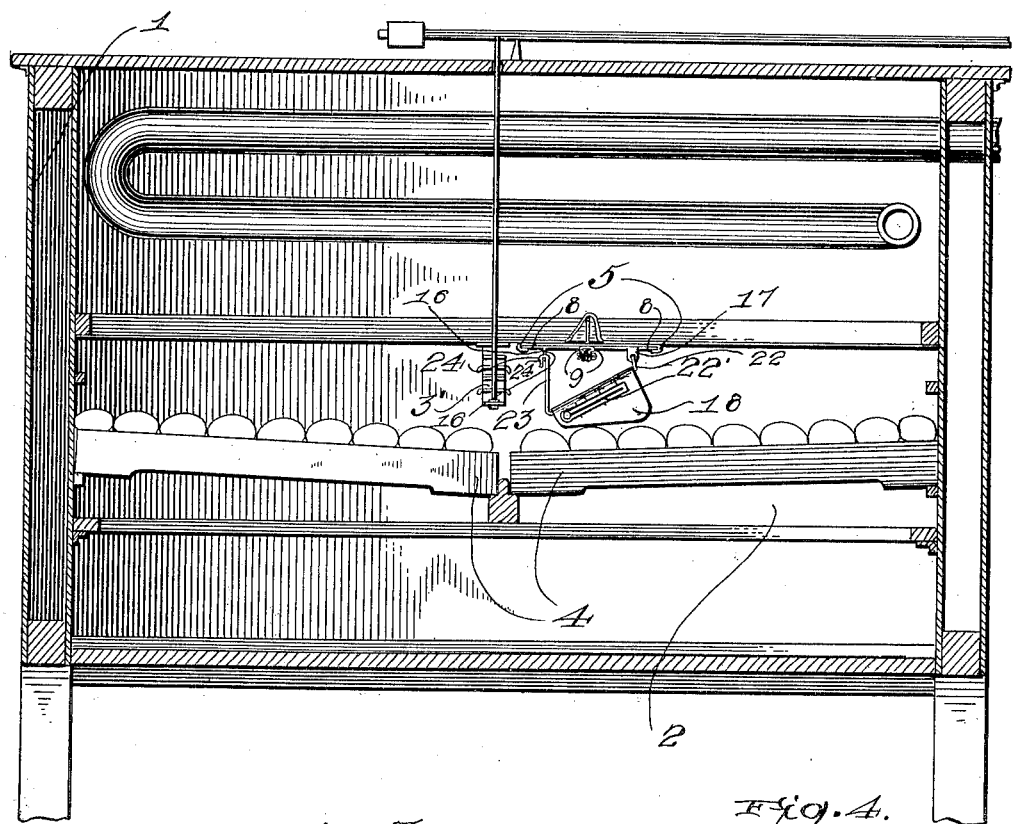
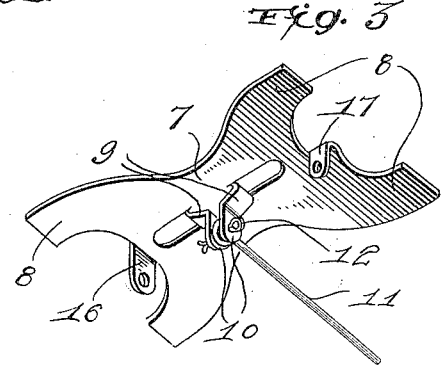
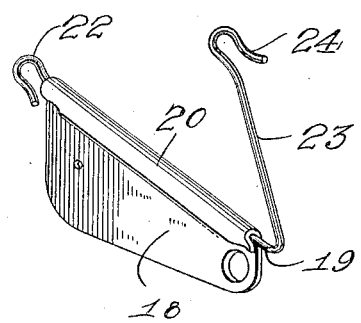
WITNESSES
INVENTOR
Murland R. Lowell
his Attorney

UNITED STATES PATENT OFFICE.

MURLAND R. LOWELL, OF BRASHER FALLS, NEW YORK.

INCUBATOR ATTACHMENT.

1,082,350. Specification of Letters Patent. Patented Dec. 23, 1913.

Application filed February 15, 1913. Serial No. 748,709.

*To all whom it may concern:*

Be it known that I, MURLAND R. LOWELL, a citizen of the United States, residing at Brasher Falls, in the county of St. Lawrence and State of New York, have invented certain new and useful Improvements in Incubator Attachments, of which the following is a specification, reference being had therein to the accompanying drawing.

This invention relates to an attachment for incubators and has reference to a device which is adapted to support the thermometer in a suspended position in the egg chamber.

Another object of this invention is the holding of the thermometer in such a position in the egg chamber as to allow the same to be drawn to the front portion of the chamber so as to allow the same to be easily inspected without necessitating the opening of the door members.

With these and other objects in view, this invention consists of certain novel combinations, constructions, and arrangement of parts, as will be hereinafter fully described and claimed.

In the accompanying drawing, Figure 1 is a perspective view of a portion of the incubator showing the attachment carried thereby. Fig. 2, is a longitudinal section of the incubator showing the device in an end elevation. Fig. 3 is a perspective view of the carriage member. Fig. 4 is a perspective view of the thermometer carrying member. Fig. 5 is a central longitudinal section taken through the carriage member. Fig. 6 is a plan view of the blank from which the carriage member is formed. Fig. 7, is a plan view of the blank from which the thermometer carrying member is formed.

Referring to the accompanying drawing by numerals it will be seen that the device is used in combination with the incubator 1 which is provided with the usual egg chamber 2. This egg chamber 2 is provided with the usual blanket 3, and thermostatic heat regulating members 3'. The egg chamber 2 is provided with the usual egg trays 4.

The attachment comprises a pair of substantially U-shape tracks 5 which are provided with the stop members 6. The carriage member comprises an elongated body 7 from which extends the diverging guiding feet 8. The body 7 is also provided with the struck-out portions 9 which are bent to extend parallel, as illustrated at 10. These struck-out portions 9 carry the end of the operating rod 11 by means of the cotter pin 12. The feet 8 are positioned within the track members 5 and since the same diverge from the body 7, the carriage will move easily within the track members 5 since the feet will prevent any tendency on the part of the carriage to revolve or wabble. This operating rod 11 is provided with the U-shape portion 12 and with the extending portion 13. The portion 13 extends through the blanket 3 and terminates in the knob 14. By use of this operating rod the carriage may be moved within the track portions 5 so as to be brought toward the forward portion of the egg chamber when it is so desired. This operating rod is provided with the U-shape portion 12 in order to allow the rod to pass through the blanket at a suitable distance from the forward portion whereby the heat from within the chamber will be prevented from escaping when the door member 15 is closed. By referring to Fig. 1 it will be seen that the U-shape portion is at a suitable distance to the rear of the carriage portion whereby the carriage member will be moved to the forward portion of the egg chamber before the portion 12 of the rod engages the blanket.

The carriage member is provided at its end portion and between the diverging legs 8 with a transversely bent ear 16 and a longitudinally bent ear 17 which are formed from the body portion of the carrier member in such a manner as to be bent at right-angles relative to each other. The thermometer supporting member comprises an elongated body 18 which engages the strand 19 by means of the bent sleeve 20. The body 18 is provided with the apertures 21 for allowing the thermometer 22 to be held thereon by any suitable means placed upon the thermometer 22, and adapted to extend through the apertures 21. The strand 19 terminates in a hook member 22 which extends at right-angles to the body 18. The opposite end of the strand 19 is provided with an arm 23 terminating in a secondary hook 24. When the device is in use, the hook 22 engages the ear 17 while the hook 24 engages the ear 16 whereby the body 18 and thermometer 22' will be supported in the egg chamber at a distance above the egg tray. By bending the ears 16 and 17 at right-angles to each other, and by forming the hooks 22 and 24 in such a manner as to engage the ears 16 and 17 the thermometer carrying member may be easily hooked in engagement with the carriage member by first placing the hook 22 in engagement with the ear 17 and by then swinging the carriage member so as to allow the hook 24 to engage the ear 16. In this manner the carrying member will be supported without the necessity of springing or bending the ears, as would be the case if the ears and hooks were formed in the same plane.

In operation the attachment is placed in a position as illustrated in Fig. 1 at which time the egg trays are placed in position within the egg chamber. The door 15 is then closed and the heat is turned on. The heat will be expelled from the chamber in the usual manner when the same reaches a pre-determined point. When it is desired to ascertain the temperature, the knob 14 is grasped and pulled outwardly whereby the carriage will slide within the track portions 5 since the same is connected to the operating rod 11 and as the thermometer carrying member is carried by the carriage it will be brought toward the forward portion of the egg chamber whereby a view may be had of the same without necessitating the opening of the door and chilling the eggs.

It will further be seen that by forming the carriage and thermometer carrying member in the manner described, the carrying member may be easily detached from the carriage when it is desired to place a new thermometer thereon, or for any other purpose.

Having thus described the invention, what is claimed as new, is:

1. In a device of the class described, the combination with an incubator provided with track portions, of a carriage slidably mounted within said track portions, said carriage provided with an elongated body, said body provided with struck-out portions said portions bent downwardly, the outer lower ends of said struck-out portions bent parallel to each other, an operating rod extending to the outside of said incubator and passing through said struck-out portions, said rod adapted to move said carriage upon said tracks and a thermometer carried by said carriage.

2. In a device of the class described, the combination with an incubator provided with a plurality of tracks, of a carriage member slidably mounted upon said tracks, said carriage member comprising an elongated body, said body provided with a plurality of struck-out portions, an operating rod passing through one side of said incubator and carried by said struck-out portions, said operating rod provided with a U-shape portion and an extending portion normally positioned in the rear portion of the incubator for being positioned out of the way projecting beyond said U-shape portion for allowing said carriage to be easily moved toward the forward portion of said incubator, and a thermometer carried by said carriage.

3. In a device of the class described, the combination with an incubator provided with a plurality of track portions, of a carriage provided with diverging guide feet carried by said track portions, an operating rod passing through one side of said incubator and carried by said carriage for sliding the same upon said track portions, said carriage provided with a plurality of downwardly bent ears, a thermometer carrying member carried by said ears, a thermometer carried by said thermometer carrying member whereby said thermometer may be drawn toward the forward portion of the incubator for allowing a view of the thermometer.

4. In a device of the class described, the combination with an incubator provided with a plurality of track portions, of a carriage slidably mounted within said track portions, means for sliding said carriage upon said track portions, said carriage provided with a plurality of downwardly bent ears, one of said ears bent at right-angles to the other of said ears, a thermometer-carrying member detachably engaging said carriage, said thermometer carrying member provided with a laterally bent hook, said carrying member also provided with an extending neck terminating in a hook, said hooks formed at right-angles to each other, said hooks adapted to engage said ears and a thermometer carried by said carrying member.

In testimony whereof I hereunto affix my signature in presence of two witnesses.

MURLAND R. LOWELL.

Witnesses:
IRA E. HEYWOOD,
GEO. H. MORGAN.

Copies of this patent may be obtained for five cents each, by addressing the "Commissioner of Patents, Washington, D. C."